H. C. HIEN.
WRENCH.
APPLICATION FILED MAR. 17, 1914.

1,110,204.

Patented Sept. 8, 1914.

Inventor
Henry C. Hien,

Witnesses
Frederick W. Ely.

By Victor J. Evans
Attorney

UNITED STATES PATENT OFFICE.

HENRY C. HIEN, OF WEBB CITY, MISSOURI.

WRENCH.

1,110,204.  Specification of Letters Patent.  Patented Sept. 8, 1914.

Application filed March 17, 1914. Serial No. 825,335.

*To all whom it may concern:*

Be it known that I, HENRY C. HIEN, a citizen of the United States, residing at Webb City, in the county of Jasper and State of Missouri, have invented new and useful Improvements in Wrenches, of which the following is a specification.

The present invention relates to improvements in wrenches adapted for use in connection with flanged sleeves, to secure the said sleeves upon a pipe, and to arrange the same to be connected with a flange or similar sleeve upon a second section of pipe, and the improvement resides in the construction, combination and operative arrangement of parts set forth in the following specification and falling within the scope of the appended claims.

Figure 1:
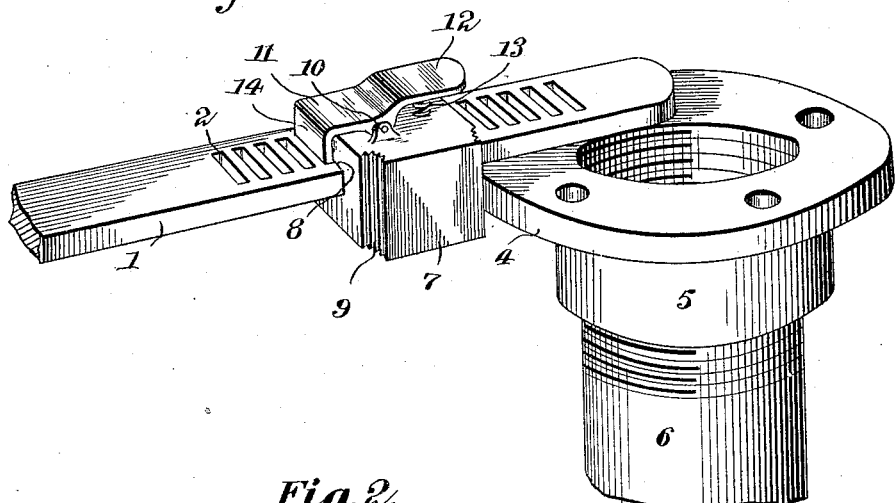
Figure 2:
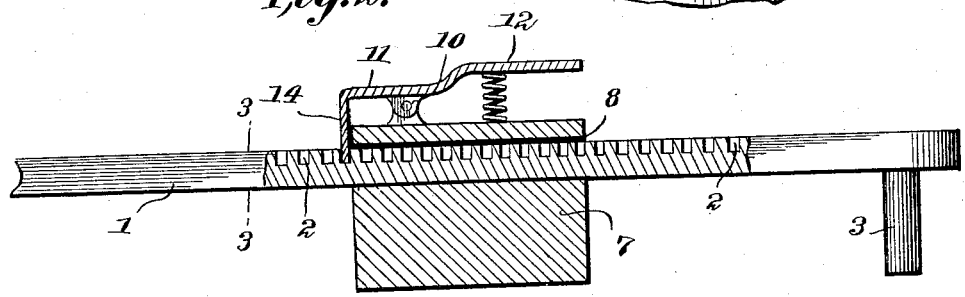
Figure 3:
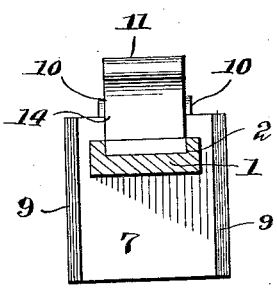

In the drawing: Figure 1 is a perspective view illustrating the wrench in operative position upon the flange of a sleeve and in the act of screwing the sleeve upon a section of pipe, Fig. 2 is a central vertical longitudinal sectional view through the wrench, and Fig. 3 is a transverse sectional view approximately on the line 3—3 of Fig. 2.

In screwing a flanged collar, or what is usually known as a union sleeve upon a pipe section, an ordinary wrench is practically useless, especially upon the flanges of such unions which are of a greater diameter than the distance between the jaws of a wrench. Therefore, it is not an uncommon practice to insert two bolts in two oppositely threaded openings in the flange of the union and arrange therebetween a bar to permit of the opposite sides or edges of the said bar contacting with the bolt when pressure is applied to the bar to rotate the union in a screwing direction.

Such arrangement is crude and requires an amount of time in placing the bolts in the bolt openings in the flange of the union, and it may therefore be considered the primary object of the present invention to provide a wrench which may be easily and quickly adjusted to engage with the varying sizes of flanges of unions and rotate the said union to thread the same upon a pipe section or remove the same from a pipe section as occasion requires.

My improved wrench includes a lever 1 which is preferably rectangular in cross section, and which has one of its faces, which, for the sake of convenience, I will term its upper face, provided with a centrally arranged longitudinally extending series of teeth 2, the same being formed by depressing the lever at proper spaced intervals. One of the ends of the lever is provided with a downwardly extending rounded finger 3, and said finger is of a size sufficient to be received within the smallest openings provided for the reception of securing bolts in the flange 4 of a union 5, the said union being threaded and adapted to be screwed within the threaded end of a pipe section 6, so that the same will be properly arranged to be connected with a similar pipe section having either a flange or similar flanged union, as will be readily understood.

The numeral 7 designates a sliding block or jaw which is provided with a substantially rectangular opening 8 through which the lever 1 is passed. The jaw at its outer corners and if desired, and as shown in the drawings, also at its inner corners, are preferably rounded inwardly, the arcuate surfaces thus provided being formed with longitudinally extending teeth or serrations 9. The block or jaw 7 upon one of its faces is provided with spaced ears 10 between which is pivotally secured the body of a dog 11, and arranged between the tail 12 of the said dog and the face of the jaw 7 is a spring 13 which is adapted to force its opposite and angular toothed end 14 within a groove or recess between two of the teeth of the shank, and whereby the jaw 7 may be retained in a longitudinally adjusted position upon the shank 1, to compensate for the various diameters of the flanges 4 with which the wrench is adapted to engage. The pivotal connection between the block and dog is preferably loose and by reference to Figs. 1 and 2 of the drawings it will be noted that the angular toothed end of the dog, which engages one of the depressions or teeth of the lever, lies against the rear end of the block or dog, so a pressure upon the jaw will be delivered directly upon the angular or toothed end of the dog, thus relieving the remainder of the dog from strain. It will be obvious that when the teeth or serrations 9 of one of the corners of the block or jaw 7 is swung into engagement with the periphery of the flange 4, after the finger 3 has been arranged within one of the bolt openings of the flange, the union may be easily and quickly screwed upon the pipe section 6, and by reversing the position of the wrench the said union may be readily unscrewed from the pipe section as described.

From the above description, taken in connection with the accompanying drawing, the simplicity of the device as well as the advantages thereof will it is thought, be perfectly apparent to those skilled in the art to which such invention appertains without further detailed description.

Having thus described the invention, what I claim is:

1. A flange wrench comprising a lever having a projecting finger at one of its ends, a rectangular block slidably mounted upon the lever and removable therefrom, said block having arcuate corners which are provided with longitudinally extending teeth, and spring pressed means upon the block co-acting with the lever for locking the block upon the lever.

2. A wrench for applying and removing flanged sleeves to and from pipes comprising a flat rectangular lever having one of its ends provided with a projecting finger to fit an opening in the sleeve, said lever having its outer face provided with a series of spaced transverse indentures, a removable and reversible rectangular block arranged for slidable movement upon the lever, ears upon the block, a substantially L-shaped dog pivoted to the ears, a spring between the tail of the dog and the block and the angular toothed portion of the dog adapted to lie against one of the faces of the block and engaged in one of the indentures.

3. A wrench for applying and removing flanged sleeves to and from pipes comprising a flat rectangular lever having one of its ends provided with a projecting finger to fit an opening in the sleeve, said lever having its outer face provided with a series of spaced transverse indentures, a rectangular block having a rectangular opening adjacent one of its faces to permit of the block being arranged upon the lever and from either of the ends of the block, the said block having arcuate corners which are provided with longitudinal teeth to engage with the flange of the sleeve, a spring pressed dog carried by the block and having a flat toothed portion which is adapted to contact with one of the ends of the block and engaged in one of the indentures of the lever.

In testimony whereof I affix my signature in presence of two witnesses.

HENRY C. HIEN.

Witnesses:
L. O. WALKER,
W. V. K. SPENCER.

Copies of this patent may be obtained for five cents each, by addressing the "Commissioner of Patents, Washington, D. C."